United States Patent
Ransom et al.

(10) Patent No.: US 8,233,295 B2
(45) Date of Patent: Jul. 31, 2012

(54) METHODS, SYSTEMS AND APPARATUS FOR APPROXIMATION OF PEAK SUMMED FUNDAMENTAL AND THIRD HARMONIC VOLTAGES IN A MULTI-PHASE MACHINE

(75) Inventors: Ray M. Ransom, Big Bear City, CA (US); Gabriel Gallegos-Lopez, Torrance, CA (US); Michael H. Kinoshita, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/720,393

(22) Filed: Mar. 9, 2010

(65) Prior Publication Data

US 2011/0224957 A1   Sep. 15, 2011

(51) Int. Cl.
H02M 1/12 (2006.01)
(52) U.S. Cl. .................................................... 363/41
(58) Field of Classification Search .............. 363/40, 363/41, 132
See application file for complete search history.

(56) References Cited

U.S. PATENT DOCUMENTS 5,383,107 A * 1/1995 Hopkins et al. ............... 363/41
* cited by examiner

*Primary Examiner* — Shawn Riley
(74) *Attorney, Agent, or Firm* — Ingrassia Fisher & Lorenz P.C.

(57) ABSTRACT

Methods, system and apparatus are provided for quickly approximating a peak summed magnitude (A) of a phase voltage (Vph) waveform in a multi-phase system that implements third harmonic injection.

20 Claims, 4 Drawing Sheets

METHODS, SYSTEMS AND APPARATUS FOR APPROXIMATION OF PEAK SUMMED FUNDAMENTAL AND THIRD HARMONIC VOLTAGES IN A MULTI-PHASE MACHINE

STATEMENT REGARDING FEDERALLY SPONSORED RESEARCH OR DEVELOPMENT

This invention was made with Government support under DE-FC26-07NT43123, awarded by the US-Department of Energy The Government has certain rights in this invention.

TECHNICAL FIELD

Embodiments of the present invention generally relate to multi-phase systems, and more particularly relate to techniques for approximating peak summed fundamental and third harmonic voltages in a multi-phase machine that implements third harmonic current injection.

BACKGROUND OF THE INVENTION

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement a three-phase pulse width modulated (PWM) inverter module, which drives a three-phase AC machine (e.g., AC motor).

Many modern high performance AC motor drives use the principle of field oriented control (FOC) or "vector" control to control operation of the AC electric motor. In particular, vector control is often used in variable frequency drives to control the torque applied to the shaft (and thus finally the speed) of an AC electric motor by controlling the current fed to the AC electric motor. In short, stator phase currents are measured and converted into a corresponding complex space vector. This current vector can then be transformed to a coordinate system rotating with the rotor of the AC electric motor.

Recently, researchers have investigated the possibility of using multi-phase machines in various applications including hybrid/electric vehicles. Higher-order multi-phase systems are characterized by additional degrees of freedom and better reliability in comparison to conventional three-phase machines, as well as by their enhanced torque producing capability.

As used herein, the term "multi-phase" refers to more than three-phases, and can be used in reference to AC electric machines that have five or more phases. One example of a multi-phase system is a five-phase system that includes a five-phase PWM inverter module that drives one or more five-phase AC machine(s). While the possibility of using five-phase systems in HEVs is being explored, a lot of work remains to be done before these inverter and motor configurations can actually be implemented particularly with respect to vector control techniques used in conjunction with such five-phase systems.

To improve dynamic performance of a multi-phase machine it is desirable to improve or increase the available mechanical torque/power that is generated and output by the multi-phase machine. One way to improve output torque (and hence machine efficiency) is to improve utilization of the inverter output or "phase" voltage that is provided to a multi-phase machine.

It is well-known that addition of odd harmonics of appropriate amplitude to a fundamental wave can improve performance of a multi-phase system. For example, a well-known technique for enhancing the performance of a multi-phase machine and improving its torque producing capability and power output is commonly referred to as "third-harmonic current injection." In third harmonic current injection, a fundamental current command and its third harmonic are used to generate voltage commands that are supplied to the multi-phase machine. Among other things, third-harmonic current injection can be used to increase the inverter output voltage (or phase voltage) and increase flux per pole of a multi-phase machine.

When the AC machine operates in the field-weakening region (medium and high speed), it operates under voltage constraints. To control the AC machine it is necessary to determine the peak phase voltage magnitude (also referred to as "peak voltage" herein) to ensure that it does not exceed a maximum phase voltage that is available to the AC machine. It is desirable to know what the peak value of the phase voltage (Vph) is with reasonable degree of accuracy in advance of every PWM period (at any electrical position) so that any necessary corrections can be made in advance. Because the phase voltage (Vph) is a sinusoidal waveform, most of the time, the phase voltage (Vph) is not at its peak value, but eventually the summed magnitude (A) will reach its peak value in the time domain. It is noted that when normalized, the peak voltage is commonly referred to as a modulation index.

When only the fundamental voltage is to be controlled, peak phase voltage magnitude can be easily calculated. However, in a multi-phase machine that implements third harmonic current injection, calculation of the peak phase voltage magnitude becomes much more complex since the phase voltage includes both a fundamental component and third harmonic component. During third-harmonic current injection the peak summed magnitude (A) of the fundamental voltage vector (V1, φ1) and the third harmonic voltage vector (V3, φ3) is determined by the equation (1) below.

$$A = V1 \cdot \cos\theta e - V3 \cos(3\theta e + \Delta\phi),$$

where V1 is the fundamental voltage vector magnitude (V1), V3 is the third harmonic voltage vector magnitude (V3), θe is the electrical angular position (θe), Δφ is the voltage angle difference (Δφ) between an angle (φ1) of the fundamental voltage vector and an angle (θ3) of the third harmonic voltage vector (φ1-φ3). The electrical angular position (θe) is a function of rotor position that is not necessarily the rotor position (θr). Rather, the electrical angular position (θ) is equal to the rotor position multiplied by a factor that is the number of machine pole pairs (i.e., θ is equal to P*θ for PM machines, or θ is equal to θ*(θr+slip position) for induction machines. Calculation of the peak summed magnitude (A) of the fundamental voltage vector (V1, φ1) and the third harmonic voltage vector (V3, φ3) requires an iterative sweep of at least 180 degrees of the function in equation (1), using a computation loop that iterates a minimum of 90 times in steps of two degrees or less. Calculating the peak voltage using ninety or more iterative computations is time consuming. In many cases, the time required for the calculation can exceed the time available for running the control loop, which in turn forces a lowering of the PWM switching frequency.

Accordingly, it would be desirable to provide techniques for reducing the time required to determine a peak summed magnitude of a fundamental voltage vector and a third harmonic voltage vector, and eliminate the need for this complex calculation including the iterative aspect of the calculation. It would be desirable to reduce the overall execution time of the control loop and thus allow for the PWM switching frequency to be increased. In this regard, it is desirable to provide methods, systems and apparatus for quickly determining peak summed magnitude of a fundamental voltage vector and a third harmonic voltage vector in a multi-phase system that implements third harmonic current injection. Furthermore, other desirable features and characteristics of the present invention will become apparent from the subsequent detailed description and the appended claims, taken in conjunction with the accompanying drawings and the foregoing technical field and background.

SUMMARY

Embodiments of the present invention relate to methods, systems and apparatus for approximating a peak summed magnitude (A) of a phase voltage (Vph) waveform in a multi-phase system that implements third harmonic injection. In one implementation, the disclosed embodiments can be applied to a five-phase vector controlled system that employs third harmonic current injection to increase torque and power output by a five-phase machine. In such implementations, the phase voltage (Vph) waveform is a sinusoidal waveform that drives any one phase of a five-phase machine. The phase voltage (Vph) waveform comprises voltage vectors including a fundamental voltage vector and a third harmonic voltage vector, and can be defined based on a magnitude (V1) of the fundamental voltage vector, a magnitude (V3) of the third harmonic voltage vector, an electrical angular position ($\theta$) that is a function of rotor position, and a voltage angle difference ($\Delta\phi$) between an angle ($\phi1$) of the fundamental voltage vector and an angle ($\phi3$) of the third harmonic voltage vector In accordance with some of the disclosed embodiments, methods are provided for approximating a peak summed magnitude (A) of a phase voltage (Vph) waveform in a multi-phase system. The peak summed magnitude (A) of the phase voltage (Vph) waveform is determined by the sum of the fundamental voltage vector and the third harmonic voltage vector.

An endpoint value (epv) is computed based on a magnitude (V1) of a fundamental voltage vector and a magnitude (V3) of a third harmonic voltage vector. The endpoint value (epv) is the lowest value of the peak summed magnitude (A) for a particular ratio of the magnitude (V1) of the fundamental voltage vector to the magnitude (V3) of the third harmonic voltage vector.

The absolute value of a function that depends on the voltage angle difference ($\Delta\phi$) is determined to generate a first scaling factor (SF1). For example, in some embodiments, the first scaling factor (SF1) can be generated by determining the absolute value of a sine function that depends on the voltage angle difference ($\Delta\phi$), whereas in other embodiments, it can be generated by determining the absolute value of a cosine function that depends on the voltage angle difference ($\Delta\phi$).

Based on the endpoint value (epv) and the first scaling factor (SF1), an unscaled approximation ($\tilde{A}$) of the peak summed magnitude (A) of the phase voltage (Vph) waveform is then determined. For example, in one embodiment, a normalization function (NF) can be applied to the endpoint value (epv) and the first scaling factor (SF1) to determine an unscaled approximation ($\tilde{A}$) of the peak summed magnitude (A) of the fundamental voltage vector and the third harmonic voltage vector.

This unscaled approximation ($\tilde{A}$) is then scaled based on a second scaling factor (SF2) to generate an approximated peak summed magnitude (A) of the phase voltage (Vph) waveform that substantially corresponds to the peak summed magnitude (A) of the phase voltage (Vph) waveform. The second scaling factor (SF2) represents the largest possible magnitude value of the phase voltage (Vph) waveform, and is defined as the sum of the fundamental voltage vector magnitude (V1) and the third harmonic voltage vector magnitude (V3). For example, in one embodiment, the unscaled approximation ($\tilde{A}$) can be multiplied by the second scaling factor (SF2) so that the unscaled approximation ($\tilde{A}$) has the same magnitude as the fundamental and third harmonic voltage vectors. This way the unscaled approximation ($\tilde{A}$) has the same magnitude as the fundamental and third harmonic voltage vectors.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Embodiments of the present invention relate to methods, systems and apparatus for approximating a peak summed magnitude (A) of a phase voltage (Vph) waveform in a multi-phase system that implements third harmonic injection. The disclosed embodiments can be applied to multi-phase systems that implement third harmonic current/voltage injection to quickly approximate peak phase voltage value for any combination of fundamental and third harmonic voltage vectors. Because the approximation method is very fast (in contrast to an actual calculation), the approximated peak summed magnitude (A) of the phase voltage (Vph) waveform can be determined within the time allotted to each PWM cycle. Stated differently, since the execution time of the control loop is reduced this allowing the PWM switching frequency to be boosted or increased to a PWM switching frequency that is faster than in other implementations where the peak voltage is iteratively calculated. As will be explained in more detail below, because the disclosed embodiments can be used to calculate the approximated peak summed magnitude (A) of the phase voltage (Vph) waveform during each PWM cycle, this also allows real-time implementation of control algorithms without exceeding the time available to perform control calculations.

In one implementation, the disclosed embodiments can be applied to a five-phase vector controlled system that employs third harmonic current injection to increase torque and power output by a five-phase machine that can be implemented in an operating environment such as a hybrid/electric vehicle (HEV). Prior to describing these embodiments in detail, a description of a system in which they can be implemented will be provided with reference to FIGS. 1 and 2. However, it will be appreciated by those skilled in the art that the same or similar techniques and technologies can be applied in the context of other systems in which it is desirable to control operation of a multi-phase system.

Figure 1:
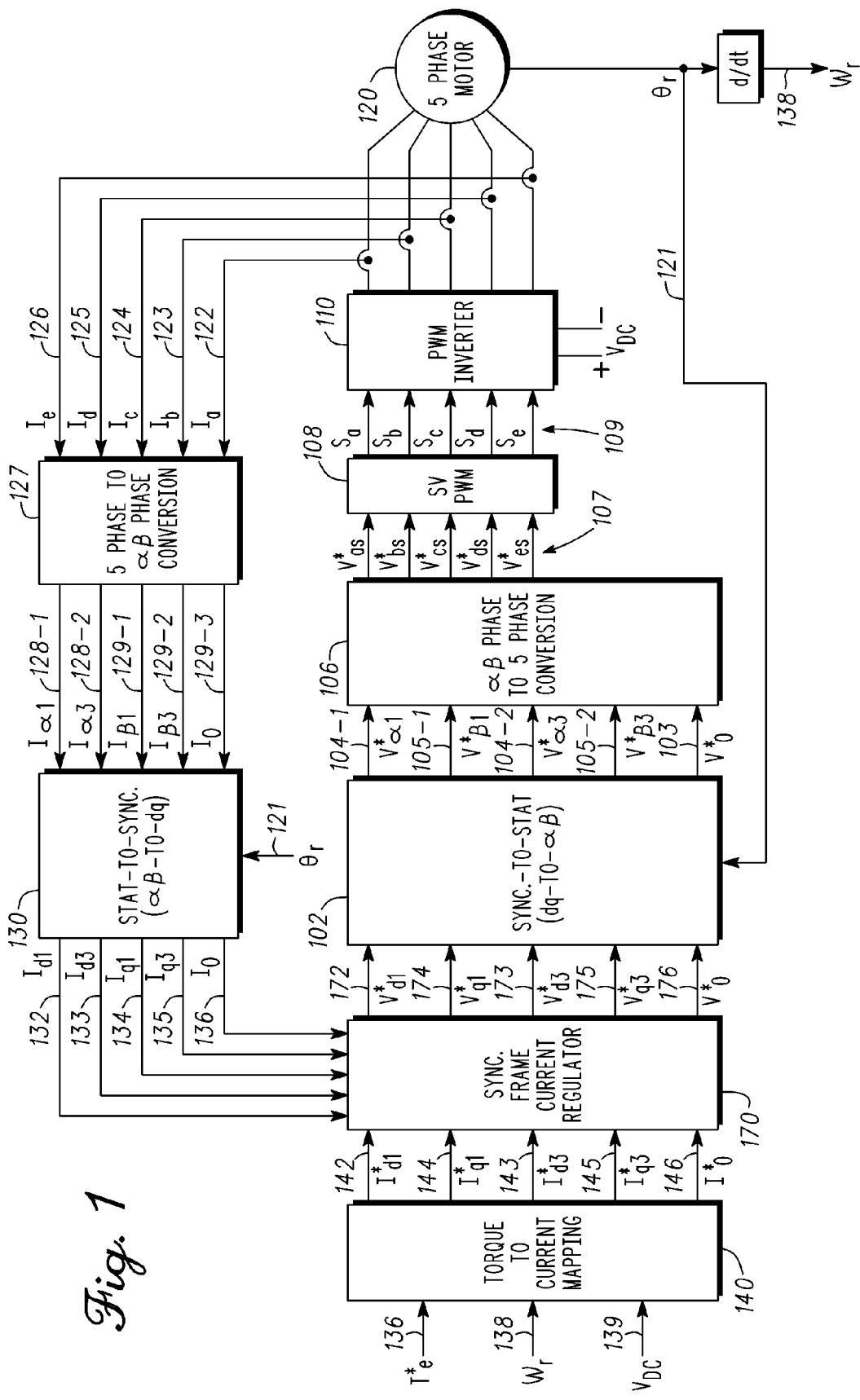
FIG. 1 is a block diagram of a vector controlled motor drive system in accordance with some embodiments of the present invention.

FIG. 1 is a block diagram of one example of a vector controlled motor drive system 100. The system 100 controls a five-phase AC machine 120 via a five-phase PWM inverter module 110 coupled to the five-phase AC machine 120 so that the five-phase AC machine 120 can efficiently use a DC input voltage (Vdc) provided to the five-phase PWM inverter module 110 by adjusting current commands that control the five-phase AC machine 120. In one particular implementation, the vector controlled motor drive system 100 can be used to control torque in an HEV.

As used herein, the term "alternating current (AC) machine" generally refers to "a device or apparatus that converts electrical energy to mechanical energy or vice versa." In implementations where the AC machine is a five-phase permanent magnet synchronous AC motor this should be understood to encompass Interior Permanent Magnet Synchronous Motors (IPMSM), Surface Mount Permanent Magnet Synchronous Motors (SMPMSM) and Reluctance Motors. In the following description of one particular non-limiting implementation, the five-phase AC machine 120 is described as a five-phase AC powered motor 120, and in particular a five-phase, interior permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes five or more phases. Thus, although the embodiment in FIG. 1 will be described with reference to a five-phase system, those skilled in the art will appreciate that the inventive concepts can be applied to other multi-phase systems (e.g., a six-phase system). Accordingly, the disclosed embodiments should not be interpreted as being limited to five-phase systems, but should be interpreted as being applicable to multi-phase systems that have five or more phases.

The five-phase AC motor 120 is coupled to the five-phase PWM inverter module 110 via five inverter poles and generates mechanical power (Torque×Speed) based on five-phase sinusoidal voltage signals received from the PWM inverter module 110. In some implementations, the angular position of a rotor (θr) of the first five-phase AC motor 120 or "shaft position" is measured using a position sensor (not illustrated), and in other implementations, the angular position of a rotor (θr) of the first five-phase AC motor 120 can be estimated without using a position sensor by using sensorless position estimation techniques.

Figure 2:
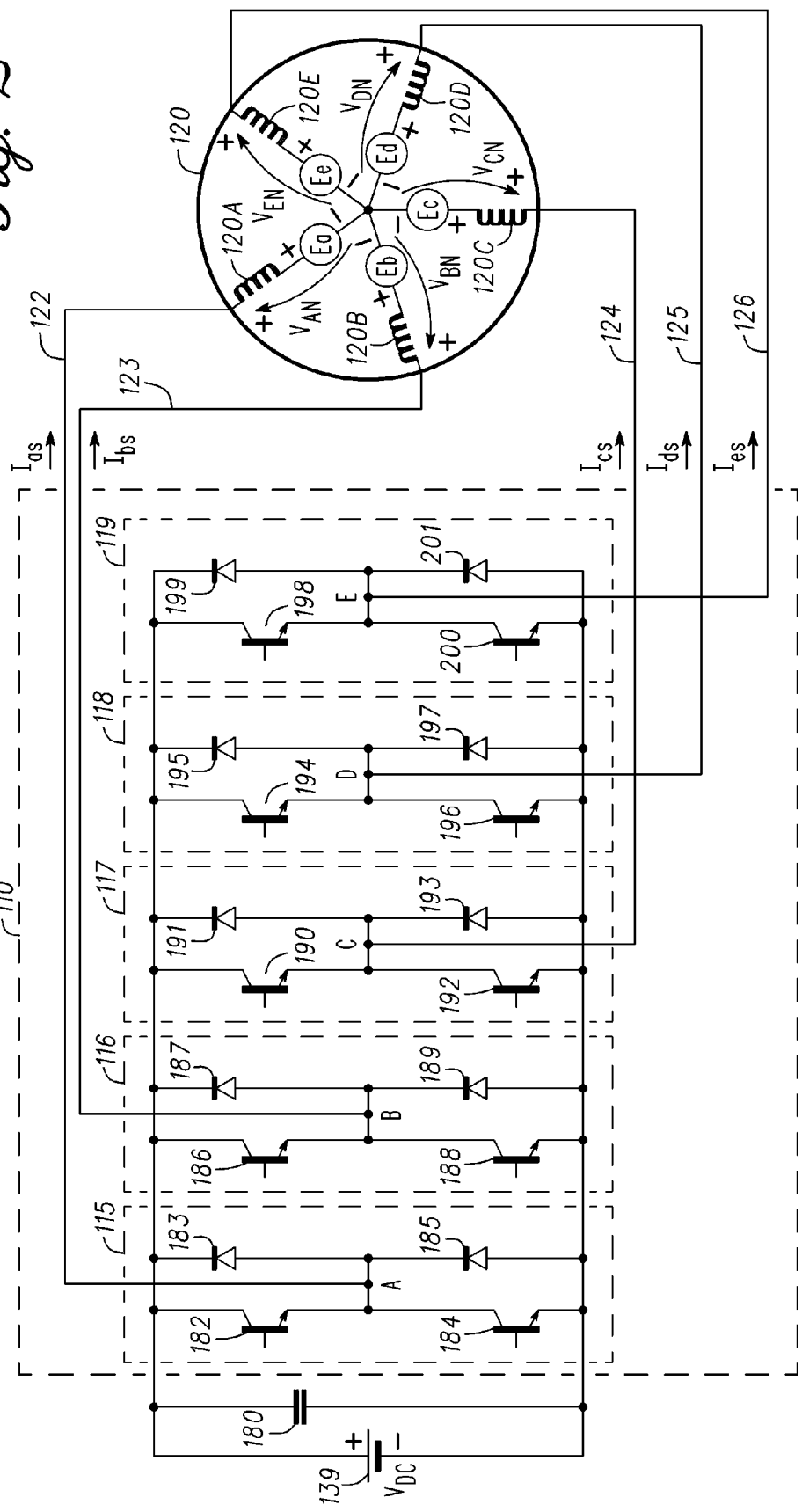
FIG. 2 is a block diagram of a portion of a motor drive system of FIG. 1 including a five-phase voltage source inverter connected to a five-phase AC motor.

Prior to describing operation details of the system 100, a more detailed description of one exemplary implementation of the five-phase voltage source inverter 110 will be provided (including how it is connected to the five-phase AC motor 120) with reference to FIG. 2. FIG. 2 is a block diagram of a portion of a motor drive system including a five-phase voltage source inverter 110 connected to a five-phase AC motor 120. It should be noted that the five-phase voltage source inverter 110 and the five-phase motor 120 in FIG. 1 are not limited to this implementation; rather, FIG. 2 is merely one example of how the five-phase voltage source inverter 110 and the five-phase motor 120 in FIG. 1 could be implemented in one particular embodiment.

As illustrated in FIG. 2, the five-phase AC motor 120 has five stator or motor windings 120a, 120b, 120c, 120d, 120e connected to motor terminals A, B, C, D, E, and the five-phase PWM inverter module 110 includes a capacitor 180 and five inverter sub-modules 115-119. In this embodiment, in phase A the inverter sub-module 115 is coupled to motor winding 120a, in phase B the inverter sub-module 116 is coupled to motor winding 120b, in phase C the inverter sub-module 117 is coupled to motor winding 120c, in phase D the inverter sub-module 118 is coupled to motor winding 120d, and in phase E the inverter sub-module 119 is coupled to motor winding 120e. The motor windings A, B, C, D, E (120a, 120b, 120c, 120d, 120e) are coupled together at a neutral point (N). The current into motor winding A 120a flows out motor windings B-E 120b-120e, the current into motor winding B 120b flows out motor windings A, C, D, E 120a and 120c-e, the current into motor winding C 120c flows out motor windings A, B, D, E 120a, 120b, 120d, 120e, the current into motor winding D 120d flows out motor windings A, B, C, E 120a-c and 120e and the current into motor winding E 120e flows out motor windings A-D 120a-d.

The resultant phase or stator currents (Ia-Ie) 122, 123, 124, 125, 126 flow through respective stator windings 120a-e. The phase to neutral voltages across each of the stator windings 120a-120e are respectively designated as $V_{an}$, $V_{bn}$, $V_{cn}$, $V_{dn}$, $V_{en}$, with the back electromagnetic force (EMF) voltages generated in each of the stator windings 120a-120e respectively shown as the voltages $E_a$, $E_b$, $E_c$, $E_d$, $E_e$ produced by ideal voltage sources, each respectively shown connected in series with stator windings 120a-120e. As is well known, these back EMF voltages $E_a$, $E_b$, $E_c$, $E_d$, $E_e$ are the voltages induced in the respective stator windings 120a-120e by the rotation of the rotor. Although not shown, the motor 120 is coupled to a drive shaft.

The inverter 110 includes a capacitor 180, a first inverter sub-module 115 comprising a dual switch 182/183, 184/185, a second inverter sub-module 116 comprising a dual switch 186/187, 188/189, a third inverter sub-module 117 comprising a dual switch 190/191, 192/193, a fourth inverter sub-module 118 comprising a dual switch 194/195, 196/197, and a fifth inverter sub-module 119 comprising a dual switch 198/199, 200/201. As such, inverter module 110 has ten solid state controlled switching devices 182, 184, 186, 188, 190, 192, 194, 196, 198, 200 and ten diodes 183, 185, 187, 189, 191, 193, 195, 197, 199, 201 to appropriately switch compound voltage ($V_{IN}$) and provide five-phase energization of the stator windings 120a, 120b, 120c, 120d, 120e of the five-phase AC motor 120.

Although not illustrated in FIG. 2, switching signals control the switching of solid state controlled switching devices 182, 184, 186, 188, 190, 192, 194, 196, 198, 200 within the inverter sub-modules 115-119. By providing appropriate switching signals to the individual inverter sub-modules 115-119, switching of solid state controlled switching devices 182, 184, 186, 188, 190, 192, 194, 196, 198, 200 within the inverter sub-modules 115-119 can be controlled to control the outputs of the inverter sub-modules 115-119 that are provided to motor windings 120a-120e, respectively. The resultant five-phase stator currents (Ia . . . Ie) 122-126 that are generated by the inverter sub-modules 115-119 of the five-phase inverter module 110 are provided to motor windings 120a, 120b, 120c, 120d, 120e. The voltages as $V_{an}$, $V_{bn}$, $V_{cn}$, $V_{dn}$, $V_{en}$, $E_a$, $E_b$, $E_c$, $E_d$, $E_e$ and the voltage at node N fluctuate over time depending on the open/close states of controlled switches 182, 184, 186, 188, 190, 192, 194, 196, 198, 200 in the inverter sub-modules 115-119 of the inverter module 110, as will be described below.

Referring again to FIG. 1, the vector control motor drive system 100 includes a torque-to-current mapping module 140, a synchronous (SYNC.) frame current regulator module 170, a synchronous-to-stationary (SYNC-TO-STAT.) transformation module 102, an αβ-phase-to-five-phase transformation module 106, a Space Vector (SV) PWM module 108, a five-phase PWM inverter 110, a five-phase-to-αβ-phase transformation module 127, and a stationary-to-synchronous (STAT-TO-SYNC.) transformation module 130. As used herein the term "module" refers to a device, a circuit, an electrical component, and/or a software based component for performing a task.

The torque-to-current mapping module 140 receives a torque command (Te*) 136, angular rotation speed (ωr) 138 of the shaft, and the DC input (or "link") voltage (Vdc) 139 as inputs. In one implementation, the angular rotation speed (ωr) 138 of the shaft can be generated based on the derivative of a rotor/shaft position output (θr) 121. Depending upon implementation the torque-to-current mapping module 140 may also receive a variety of other system parameters. The torque-to-current mapping module 140 uses the inputs to map the torque command (Te*) 136 to a fundamental d-axis current command signal (Id1*) 142, a third harmonic d-axis current command signal (Id3*) 143, a fundamental q-axis current command signal (Iq1*) 144, a third harmonic q-axis current command signal (Iq3*) 145, and a zero sequence current command signal (I0*) 146. These current command signals will cause the motor 120 to generate the commanded torque (Te*) at speed (ωr) 138. The synchronous reference frame current command signals 142-146 are DC commands that have a constant value as a function of time. Because the current commands are DC signals in the synchronous reference frame it is easier to regulate current commands.

The five-phase-to-αβ-phase transformation module 127 receives the measured five-phase stationary reference frame stator currents (Ia . . . Ie) 122-126 that are feedback from motor 120. The five-phase-to-αβ-phase transformation module 127 uses these five-phase stationary reference frame feedback stator currents 122-126 and performs an abcde reference frame-to-αβ reference frame transformation to transform the five-phase stationary reference frame feedback stator currents 122-126 into αβ stationary reference frame stator currents (Iα1, Iα3, Iβ1, Iβ3, I0) 128-1, 128-2, 129-1, 129-2, 129-3. The five-to-two phase transformation can be performed using the matrices defined in equation (1) below.

$$\begin{bmatrix} I_{\alpha 1} \\ I_{\beta 1} \\ I_{\alpha 3} \\ I_{\beta 3} \\ I_0 \end{bmatrix} = \qquad (1)$$

$$\frac{2}{5}\begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \times \begin{bmatrix} I_a \\ I_b \\ I_c \\ I_d \\ I_e \end{bmatrix}$$

In equation (1) the column vector that represents the five-phase stationary reference frame feedback stator currents 122-126 is multiplied by a transformation matrix and scaling factor to generate a column vector that represents the αβ stationary reference frame stator currents (Iα1, Iα3, 1β1, Iβ3, I0) 128-1, 128-2, 129-1, 129-2, 129-3.

The stationary-to-synchronous transformation module 130 receives the αβ stationary reference frame stator currents (Iα1, Iα3, Iβ1, Iβ3, I0) 128-1, 128-2, 129-1, 129-2, 129-3 and the rotor angular position (θr) 121 and transforms them to a fundamental synchronous reference frame d-axis current signal (Id1) 132, a third harmonic synchronous reference frame d-axis current signal (Id3) 133, a fundamental synchronous reference frame q-axis current signal (Iq1) 134, a third harmonic synchronous reference frame q-axis current signal (Iq3) 135 and a synchronous reference frame zero sequence current signal (Iq3) 136. The d1q1 reference frame rotates at synchronous speed, whereas the d3q3 reference frame rotates at three times synchronous speed. The process of stationary-to-synchronous conversion is well-known in the art and for sake of brevity will not be described in detail. In one implementation, the stationary-to-synchronous transformation can be performed using equation (2) below.

$$\begin{bmatrix} I_{d1} \\ I_{q1} \\ I_{d3} \\ I_{q3} \\ I_0 \end{bmatrix} = \begin{bmatrix} M(\theta_e) & 0 & 0 \\ 0 & M(3\theta_e) & 0 \\ 0 & 0 & 1 \end{bmatrix} \times \begin{bmatrix} I_{\alpha 1} \\ I_{\beta 1} \\ I_{\alpha 3} \\ I_{\beta 3} \\ I_0 \end{bmatrix}, \qquad (2)$$

where $M(\theta_e) = \begin{bmatrix} \cos\theta_e & \sin\theta_e \\ -\sin\theta_e & \cos\theta_e \end{bmatrix}$ and $M(3\theta_e) = \begin{bmatrix} \cos3\theta_e & \sin3\theta_e \\ -\sin3\theta_e & \cos3\theta_e \end{bmatrix}$ M($\theta_e$) is a matrix that is a function of electrical angular position, $\theta$e, and M(3$\theta$e) represents that the electrical angular position, $\theta$e, is multiplied by three to represent the third harmonic function. The electrical angular position, $\theta$e, represents the electrical position, which is the product of the number of pole pairs and rotor angular position ($\theta$r). The synchronous frame current regulator module 170 receives the fundamental synchronous reference frame d-axis current signal (Id1) 132, the third harmonic synchronous reference frame d-axis current signal (Id3) 133, the fundamental synchronous reference frame q-axis current signal (Iq1) 134, the third harmonic synchronous reference frame q-axis current signal (Iq3) 135, the synchronous reference frame zero sequence current signal (I0) 136, the fundamental d-axis current command signal (Id1*) 142, the third harmonic d-axis current command signal (Id3*) 143, the fundamental q-axis current command signal (Iq1*) 144, the third harmonic q-axis current command signal (Iq3*) 145, the zero sequence current command signal (I0*) 146, and uses these signals to generate a fundamental d-axis voltage command signal (Vd1*) 172, a third harmonic d-axis voltage command signal (Vd3*) 173, a fundamental q-axis voltage command signal (Vq1*) 174, a third harmonic q-axis voltage command signal (Vq3*) 175, and a zero sequence voltage command signal (V0*) 176. To do so, the synchronous frame current regulator module 170 includes synchronous current regulator modules (not shown) that are used to convert respective current command signals 142-145 to voltage command signals 172-175. The voltage command signals 172-176 are also synchronous reference frame signals and are therefore DC commands that have a constant value as a function of time. The process of current to voltage conversion can be implemented as a Proportional-Integral (PI) controller, which is well-known in the art and for sake of brevity will not be described here in detail. In one implementation, each current regulator module implements a Proportional-Integral (PI) controller that includes a summing junction and a proportional-integral (PI) controller module that are used to covert input current to voltage. Each summing junction subtracts the feedback synchronous reference frame current signal from the corresponding current command signal to generate a current error signal, which is then provided to PI controller module. Based on the current error signal, each PI controller module generates one of the voltage command signals 172-175.

As its inputs the synchronous-to-stationary transformation module 102 receives the synchronous reference frame voltage command signals 172-176 from the synchronous frame current regulator module 170, and the rotor position output ($\theta$r) 121. In response to these inputs, the synchronous-to-stationary transformation module 102 performs a dq-to-$\alpha\beta$ transformation based on these signals to generate a fundamental $\alpha$-axis stationary reference frame voltage command signal (V$\alpha$1*) 104-1, a fundamental $\beta$-axis stationary reference frame voltage command signal (V$\beta$1*) 105-1, a third harmonic $\alpha$-axis stationary reference frame voltage command signal (V$\alpha$3*) 104-2, a third harmonic $\beta$-axis stationary reference frame voltage command signal (V$\beta$3*) 105-2, and a zero sequence voltage command signal (V0*) 103. These voltage command signals are in the stationary reference frame and therefore have values that vary as a sine wave as a function of time. The process of synchronous-to-stationary transformation is well-known in the art and for sake of brevity will not be described in detail. In one implementation, the synchronous-to-stationary transformation can be performed using equation (3) below.

$$\begin{bmatrix} V_{\alpha 1}^* \\ V_{\beta 1}^* \\ V_{\alpha 3}^* \\ V_{\beta 3}^* \\ V_0^* \end{bmatrix} = \begin{bmatrix} M(\theta_e) & 0 & 0 \\ 0 & M(3\theta_e) & 0 \\ 0 & 0 & 1 \end{bmatrix}^{-1} \times \begin{bmatrix} V_{d1}^* \\ V_{q1}^* \\ V_{d3}^* \\ V_{q3}^* \\ V_0^* \end{bmatrix} \quad (3)$$

The $\alpha\beta$-to-five phase transformation module 106 receives the stationary reference frame voltage command signals (V$\alpha$1*, V$\beta$1*, V$\alpha$3*, V$\beta$3*, V0*) 103-105 generated by the synchronous-to-stationary transformation module 102, and based on these signals, generates five-phase stationary reference frame voltage command signals (Vas* ... Ves*) 107 that are sent to the Space Vector Pulse Width Modulation (SVPWM) module 200. The five-to-five phase transformation can be performed using the matrices defined in equation (4) below.

$$\begin{bmatrix} V_{as}^* \\ V_{bs}^* \\ V_{cs}^* \\ V_{ds}^* \\ V_{es}^* \end{bmatrix} = \frac{5}{2}\begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix}^{-1} \times \begin{bmatrix} V_{\alpha 1}^* \\ V_{\beta 1}^* \\ V_{\alpha 3}^* \\ V_{\beta 3}^* \\ V_0^* \end{bmatrix} \quad (4)$$

In equation (4) the column vector that represents the stationary reference frame voltage command signals (V$\alpha$1*, V$\beta$1*, V$\alpha$3*, V$\beta$3*, V0*) 103-105 is multiplied by a transformation matrix and scaling factor to generate a column vector that represents the five-phase stationary reference frame voltage command signals (Vas* ... Ves*) 107.

The SVPWM module 108 is used for the control of pulse width modulation (PWM). The five-phase PWM inverter module 110 is coupled to the SVPWM module 108. The SVPWM module 108 receives the five-phase stationary reference frame voltage command signals (Vas* ... Ves*) 107 as inputs, and pulse width modulates (PWM) these signals to generate switching vector signals (Sa ... Se) 109, which it provides to the five-phase PWM inverter module 110. The particular SV modulation algorithm implemented in the SV PWM module 108 can be any known SV modulation algorithm. The switching vector signals (Sa ... Se) 109 control the switching states of switches in PWM inverter 110 to generate five-phase voltage commands. More specifically, the five-phase PWM inverter module 110 receives the DC input voltage (Vdc) and switching vector signals (Sa ... Se) 109, and uses them to generate five-phase alternating current (AC) voltage signal waveforms at inverter poles that drive the five-phase AC machine/motor 120 at varying speeds.

The five-phase permanent magnet synchronous motor 120 receives the five-phase voltage signals generated by the PWM inverter 110 and generates a motor output at the commanded torque Te* 136. In this one particular implementation, the motor 120 comprises a five-phase interior permanent-magnet synchronous motor (PMSM) 120. The measured feedback stator currents (Ia-Ie) are sensed, sampled and provided to the five-phase-to-αβ-phase transformation module 127 as described above.

Although not illustrated in FIG. 1, the system 100 may also include a gear coupled to and driven by a shaft of the five-phase AC machine 120.

As described above, third harmonic current injection techniques can be used to improve torque and output power of a multi-phase machine. Prior to describing the disclosed embodiments the relationships between various currents and voltages for both the fundamental and third harmonic will first be described with reference to equations (5) through (23).

Both the fundamental current and the third harmonic current can be represented as a vector having a magnitude and angle (β). In particular, the fundamental current can be represented in vector notation as (I1, β1), where I1 is the peak fundamental current, and β1 is the fundamental current angle. The peak fundamental current (I1), and the fundamental current angle (β1) can be computed based on the equations (5) and (6) below, where equation (5) also expresses a relationship between the fundamental RMS current (I1rms*).

$$I1 = \sqrt{I_{d1}^{*2} + I_{q1}^{*2}} = \sqrt{2} \cdot I1_{rms}^* \tag{5}$$

$$\beta_1 = \arctan\left(\frac{-I_{d1}^*}{I_{q1}^*}\right) \tag{6}$$

Given these relationships, the fundamental synchronous reference frame d-axis current signal (Id1*) 142, and the fundamental synchronous reference frame q-axis current signal (Iq1*) 144 can be expressed as indicated in equations (7) and (8) as follows:

$$Id1^* = \sqrt{2} \cdot I1_{rms}^* \sin(\beta 1) \tag{7}$$

$$Iq1^* = \sqrt{2} \cdot I1_{rms}^* \cos(\beta 1) \tag{8}$$

The relationship between the fundamental RMS current (I1rms*) and total RMS phase current (Irmstotal*) can be expressed in equation (9) as follows:

$$I1rms^* = Irmstotal^* \cdot \frac{1}{\sqrt{1 + k_3^2}}, \tag{9}$$

where k3 is the third harmonic current injection factor (k3), which is a scaling factor that establishes the ratio between the fundamental RMS current (I1rms*) and the third harmonic RMS current (I3rms*), as will be described below.

In addition, the peak fundamental voltage (V1), and the fundamental voltage angle (φ1) can be computed based on the equations (10) and (11) below, where Vd1* is the fundamental d-axis voltage command signal (Vd1*) 172, and Vq1* is the fundamental q-axis voltage command signal (Vq1*) 174.

$$V1 = \sqrt{V_{d1}^{*2} + V_{q1}^{*2}} \tag{10}$$

$$\varphi_1 = \arctan\left(\frac{-V_{d1}^*}{V_{q1}^*}\right) \tag{11}$$

Likewise, the third harmonic current can be represented in vector notation as (I3, β3), where I3 is the peak third harmonic current, and β3 is the third harmonic current angle. The peak third harmonic current (I3), and the third harmonic current angle (β3) can be computed based on the equations (12) and (13) below, where equation (12) also expresses a relationship between the third harmonic RMS current (I3rms*) and the peak third harmonic current (I3).

$$I3 = \sqrt{I_{d3}^{*2} + I_{q3}^{*2}} = \sqrt{2} \cdot I3_{rms}^* \tag{12}$$

$$\beta_3 = \arctan\left(\frac{-I_{d3}^*}{I_{q3}^*}\right) \tag{13}$$

Given these relationships, the third harmonic synchronous reference frame d-axis current signal (Id3*) 143, and the third harmonic synchronous reference frame q-axis current signal (Iq3*) 145 can be expressed as in indicated in equations (14) and (15) as follows:

$$Id3^* = \sqrt{2} \cdot I3_{rms}^* \sin(\beta 3) \tag{14}$$

$$Iq3^* = \sqrt{2} \cdot I3_{rms}^* \cos(\beta 3) \tag{15}$$

The relationship between the third harmonic RMS current (I3rms*) and total RMS phase current (Irmstotal*) can be expressed in equation (16) as follows:

$$I3rms^* = Irmstotal^* \cdot \frac{k_3}{\sqrt{1 + k_3^2}}. \tag{16}$$

In addition, the peak third harmonic voltage (V3), and the third harmonic voltage angle (φ3) can be computed based on the equations (17) and (18) below, where Vd3* is the third harmonic d-axis voltage command signal (Vd3*) 173, and Vq3* is the third harmonic q-axis voltage command signal (Vq3*) 175.

$$V3 = \sqrt{V_{d3}^{*2} + V_{q3}^{*2}} \tag{17}$$

$$\varphi_3 = \arctan\left(\frac{-V_{d3}^*}{V_{q3}^*}\right) \tag{18}$$

In addition, torque can be computed based on equation (19) below $$\text{Torque} = T1 + T2 - T3, \text{ where} \tag{19}$$

$$T1 = \frac{5}{2}[\Psi_{f1} I_{q1}^* + (L_{d1} - L_{q1}) I_{d1}^* I_{q1}^*]$$

$$T2 = \frac{15}{2}[\Psi_{f3} I_{q3}^* + (L_{d3} - L_{q3}) I_{d3}^* I_{q3}^*]$$

$$T3 = 5L_{13}(I_{d3}^* I_{q1}^* - I_{q3}^* I_{d1}^*),$$

where Ld1, Lq1, Ld3, Ld3, L13 are the fundamental d-axis inductance (Ld1), fundamental q-axis inductance (Lq1), third harmonic d-axis inductance (Ld3), third harmonic q-axis inductance (Lq3), mutual inductance (L13), where Ψf1, Ψf3 are the fundamental flux linkage constant (TM and the third flux linkage constant (Ψf3).

Voltages (Vd1*, Vq1*, Vd3*, Vq3*) 172, 174, 173, 175 can be computed using equations (20) through (23) respectively as follows.

$$V_{d1}^* = \omega_r \Psi_{sq1} = -\omega_r(L_{q1}I_{q1}^* + L_{13}I_{q3}^*) \tag{20}$$

$$V_{q1}^* = \omega_r \Psi_{sd1} = \omega_r(L_{d1}I_{d1}^* + L_{13}I_{d3}^* + \Psi_{f1}) \tag{21}$$

$$V_{d3}^* = 3\omega_r \Psi_{qs3} = 3\omega_r(L_{q3}I_{q3}^* + L_{31}I_{q1}^*) \tag{22}$$

$$V_{q3}^* = 3\omega_r \Psi_{ds3} = 3\omega_r(L_{d3}I_{d3}^* + L_{31}I_{d1}^* + \Psi_{f3}) \tag{23},$$

where $\Psi$sq1, $\Psi$sd3, $\Psi$qs3, $\Psi$ds3 are the fundamental q-axis flux linkage ($\Psi$sq1), the third harmonic d-axis flux linkage ($\Psi$sd3), the third harmonic q-axis flux linkage ($\Psi$qs3), the third harmonic d-axis flux linkage ($\Psi$ds3), respectively.

As noted above, it would be desirable to provide techniques for determining maximum phase voltage in a multi-phase system that implements third harmonic current/voltage injection within a time allotted to each PWM cycle. In accordance with the disclosed embodiments, methods, systems and apparatus are provided for approximating peak phase voltage for any combination of fundamental and third harmonic voltage vectors in real-time during each PWM cycle. In one embodiment, a method is provided for approximating the peak summed magnitude of a fundamental voltage vector and a third harmonic voltage vector. The disclosed embodiments can be used to derive information that allows for fast approximation of peak summed fundamental and third harmonic voltages in a multi-phase system (i.e., an approximate of the maximum sum of fundamental and third harmonic vector voltages) within the time available during each PWM cycle. Various embodiments will now be described with reference to FIGS. 3-7.

Figure 3:
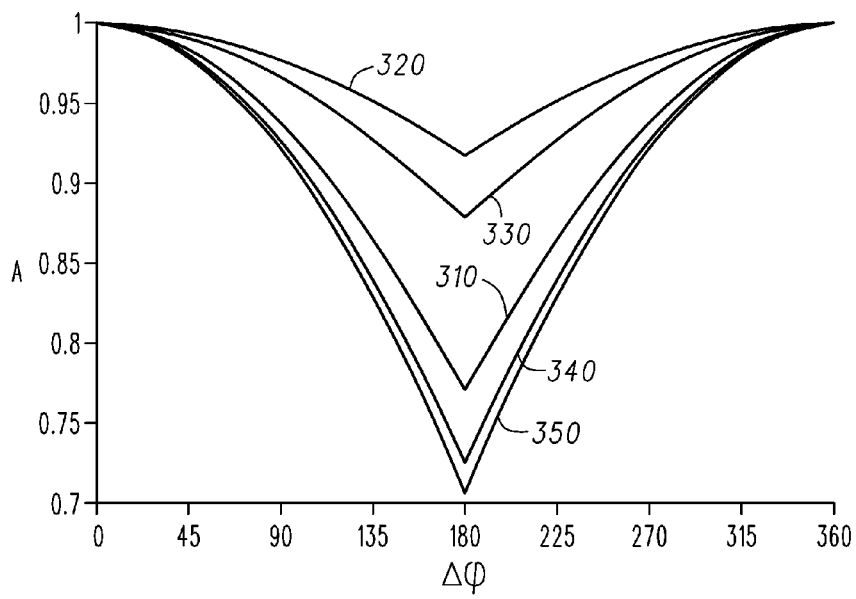
FIG. 3 is a graph showing a set of curves that plot a peak summed magnitude (A) of the fundamental voltage vector and the third harmonic voltage vector as a function of a voltage angle difference ($\Delta\phi$) between an angle ($\phi1$) of the fundamental voltage vector and an angle ($\theta$) of the third harmonic voltage vector.

FIG. 3 is a graph showing a set of curves 310-350 that plot a peak summed magnitude (A) of the fundamental voltage vector and the third harmonic voltage vector as a function of a voltage angle difference ($\Delta\phi$) between an angle ($\phi$1) of the fundamental voltage vector and an angle ($\theta$) of the third harmonic voltage vector. In other words, in FIG. 3, the x-axis represents the voltage angle difference ($\Delta\phi$) between an angle ($\phi$1) of the fundamental voltage vector and an angle ($\phi$3) of the third harmonic voltage vector, and the y-axis represents the peak phase voltage in normalized values (i.e., peak summed magnitude (A) of the fundamental voltage vector and the third harmonic voltage vector).

Five curves 310-350 are depicted, each representing the output values of the peak summed magnitude (A) for all values of $\Delta\phi$ at a single value for V1/V3. Every point of each curve 310-350 is the peak summed magnitude (A). This peak summed magnitude (A) depends on the value of the voltage angle difference ($\Delta\phi$). Although five curves are shown, there are potentially an infinite number of other curves (not shown) that correspond to the infinite number of possible values for V1/V3. As such, each curve 310-350 represents a different ratio of the magnitude (V1) of the fundamental voltage vector and the magnitude (V3) of the third harmonic voltage vector. For example, curve 310 represents a one-to-one ratio between the magnitude (V1) of the fundamental voltage vector and the magnitude (V3) of the third harmonic voltage vector, curve 320 represents a 0.2-to-one ratio between the magnitude (V1) of the fundamental voltage vector and the magnitude (V3) of the third harmonic voltage vector, curve 330 represents a 0.33-to-one ratio between the magnitude (V1) of the fundamental voltage vector and the magnitude (V3) of the third harmonic voltage vector, curve 340 represents a five-to-one ratio between the magnitude (V3) of the fundamental voltage vector and the magnitude (V3) of the third harmonic voltage vector, and curve 350 represents a three-to-one ratio between the magnitude (V1) of the fundamental voltage vector and the magnitude (V3) of the third harmonic voltage vector. For each curve 310-350, the voltage angle difference ($\Delta\phi$) is varied over a range from 0 degrees to 360 degrees.

As used herein an "endpoint value" for each curve 310-350 refers to the lowest value for the peak summed magnitude (A) for that curve. As illustrated in FIG. 3, an endpoint value (i.e., lowest peak summed magnitude (A)) for a particular curve always occurs at $\Delta\phi$=180 degrees. In other words, for each curve, the value of A at $\Delta\phi$=180 degrees is always the minimum value. In addition, peak summed magnitude (A) values corresponding to the voltage angle difference ($\Delta\phi$) values greater than 180 degrees are mirror images of the voltage angle difference ($\Delta\phi$) values below 180 degrees. That is, the portion of each curve 310-350 where the voltage angle difference ($\Delta\phi$) is greater than 180 degrees is a mirror image of the portion of each curve 310-350 where the voltage angle difference ($\Delta\phi$) is less than 180 degrees.

In addition, the shape of each curve 310-350 from 0 to 360 degrees is very closely approximated by abs (cos(x/2)), where 0<=x<=360 degrees. Alternatively, curves 310-350 can also be approximated by cos(x/2), when 0<=x<=180, and by cos ($\pi$-x/2), when x is between 180 degrees and 360 degrees. As such, each of these curves 310-350 can be approximated by the function abs(cos($\Delta\phi$/2)) (or by the function cos($\Delta\phi$/2), and cos($\pi$-($\Delta\phi$/2))), and then scaled such that the value at $\Delta\phi$=0 degrees is the maximum normalized peak summed magnitude (A) of the fundamental voltage vector and the third harmonic voltage vector (V1+V3), the value at $\Delta\phi$=180 degrees is at its minimum normalized peak summed magnitude (A), and the value when $\Delta\phi$ is between 0 and 180 degrees is between the minimum and maximum normalized peak summed magnitude (A).

As will now be described below, the peak summed magnitude (A) can be approximated by deriving a function that produces an endpoint value (epv) when the voltage angle difference ($\Delta\phi$) is 180 degrees for any magnitude ratio of the fundamental-to-third harmonic voltage vectors (V1/V3).

Figure 4:
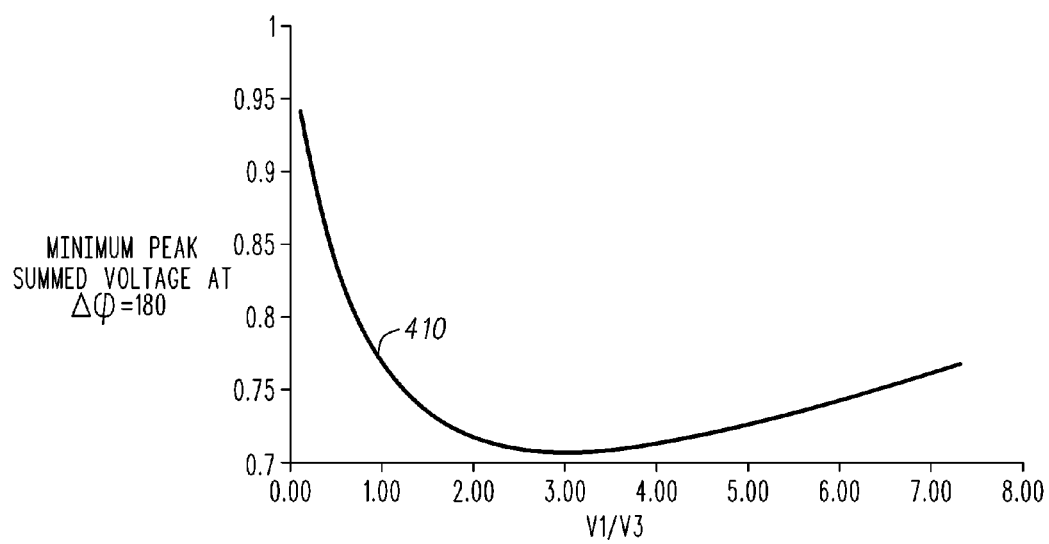
FIG. 4 is a graph showing a curve that plots endpoint values as a function of magnitude ratios of the fundamental-to-third harmonic voltage vector (V1/V3)

FIG. 4 is a graph showing a curve 410 that plots endpoint values (at $\Delta\phi$=180 degrees) as a function of magnitude ratios of the fundamental-to-third harmonic voltage vector (V1/V3). The y-axis represents the endpoint values for ratios of V1/V3 that are shown on the x-axis. As will be described below, the curve 410 can be approximated via any well-known curve-fitting, interpolation and/or smoothing techniques to generate an endpoint value function (EVF) is a function of V1/V3 and approximates curve 410.

Figure 5:
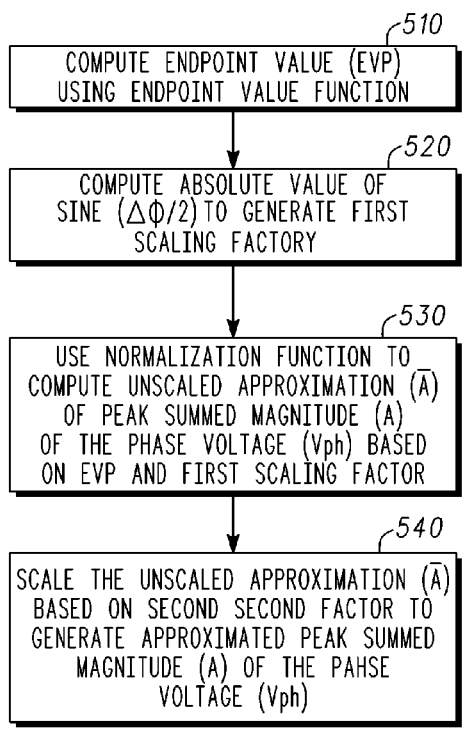
FIG. 5 is a flowchart illustrating a method for approximating peak summed magnitude (A) of a fundamental voltage vector and a third harmonic voltage vector according to one exemplary embodiment.

FIG. 5 is a flowchart illustrating a method 500 for approximating peak summed magnitude (A) of a fundamental voltage vector and a third harmonic voltage vector according to one exemplary embodiment. Method 500 is used to approximate the peak summed magnitude (A) of a phase voltage (Vph) (e.g., the peak voltage value of a sinusoidal phase voltage waveform (Vph)) that is the sum of the fundamental voltage vector and the third harmonic voltage vector for all possible values of $\theta$e. The phase voltage (Vph) may correspond to the voltage for any one of the motor phases A . . . E in FIGS. 1 and 2. The total phase voltage (Vph) has a sinusoidal waveform and is the sum of fundamental and third harmonic voltage vectors. Because these vectors can both be positive or negative and the angle at which Vph occurs is irrelevant, the third harmonic voltage can either be added to or subtracted from the fundamental voltage, and therefore it makes no difference whether they are added to or subtracted from each other when considering the full range of input values. In this embodiment, when third harmonic injection is implemented, the phase voltage (Vph) (for any phase a, b, c, d, e) can be expressed as indicated in equation (24) below. This covers the case when the vectors are added.

$$Vph = V1 \cdot \cos(\theta e) - V3 \cdot \cos(3\theta e + \Delta\phi) \quad (24),$$

where Vph represents a sinusoidal phase voltage waveform, V1 is the magnitude of the fundamental voltage vector, V3 is the magnitude of the third harmonic voltage vector, θe is the electrical angular position (θe), Δφ is the voltage angle difference (Δφ) between an angle (φ1) of the fundamental voltage vector and an angle (θ3) of the third harmonic voltage vector (φ1-φ3). The electrical angular position (θe) is a function of rotor position that is not necessarily the rotor position (θr). Rather, the electrical angular position (θe) is equal to the rotor position multiplied by a factor that is the number (P) of machine pole pairs (i.e., θe is equal to P*θe for PM machines, or θe is equal to P*(θr+slip position) for induction machines). The magnitude (V1) of the fundamental voltage vector and the fundamental voltage angle (y1) can be computed based on the equations (10) and (11) above, and the magnitude (V3) of the third harmonic voltage vector and the third harmonic voltage angle (y3) are computed based on the equations (17) and (18) above.

As used herein, the term "magnitude" is used in conjunction with vector representation, whereas the term "peak" is a term used in conjunction with time domain representation. The magnitude the phase voltage (Vph) is represented in peak value (as opposed to RMS value), and therefore, the magnitude the phase voltage (Vph) and the peak value of the phase voltage (Vph) are the same. V1 and V3 are the respective magnitudes of fundamental and third harmonic voltage vectors.

As described above, in a conventional computation, equation (24) above has to be evaluated over one electrical cycle (i.e., where θr ranges over 360 degrees). This evaluation is time consuming and inefficient and consumes significant computing resources (e.g., DSP throughput). Accordingly, an alternative way of approximating the peak (A) of phase voltage that is faster and more efficient is highly desirable.

In accordance with the disclosed embodiments, the peak value of phase voltage (Vph) can be approximated instead of being iteratively calculated or computed. In one embodiment, method 500 can be used to approximate the peak summed magnitude (A) of the phase voltage (Vph).

Method 500 begins at step 510, where an endpoint value (epv) is computed based on the magnitude (V1) of the fundamental voltage vector and the magnitude (V3) of the third harmonic voltage vector. In one implementation, the magnitude (V1) of the fundamental voltage vector and the magnitude (V3) of the third harmonic voltage vector are input into an endpoint value function (EVF) (created as described above) to compute an endpoint value (epv). The endpoint value function (EVF) is a function of magnitude ratio of the fundamental-to-third harmonic voltage vector (V1/V3). In one non-limiting exemplary implementation, the EVF is approximated by equation (25) as follows:

$$EVF(x) = (a + x^*(c + x^*e)) / (1.0 + x^*(b + x^*d)) \quad (25),$$

where: x=V1/V3, and the values for a, b, c, d, e are coefficients determined by the curve fitting routine. From the EVF, it is possible to compute an endpoint value (epv) given any V1, V3. As will be described below, once the endpoint value is known from V1/V3, and a value for Δφ is known, a value of the peak summed magnitude (A) can be closely approximated for any electrical angle (θ) value. The EVF above is merely one non-limiting implementation and that many other EVFs could be utilized depending on the implementation and the curve-fitting routine that is used to generate the EVF. The exemplary EVF shown above provides a good compromise between speed and accuracy.

At step 520, a first scaling factor (SF1) is generated based on a voltage angle difference between an angle of the fundamental voltage vector and an angle of the third harmonic voltage vector. In one embodiment, the absolute value of the function sine (Δφ/2) is computed to generate a first scaling factor (SF1), where Δφ is voltage angle difference (Δφ) between an angle (φ1) of the fundamental voltage vector and an angle (θ) of the third harmonic voltage vector. Because the first 180 degrees and the last 180 degrees are mirror images of each other, the absolute value of the function sine (Δφ/2) is used to compute SF1 to "fold back" or limit the angle Δφ to the range of 0° to 180° (i.e., to exclude the interval over 180° to 360°) after computing sine (Δφ/2). The upper half must be folded back into the lower half so that the same method can be used for all angles. In the exemplary implementation, this is done by taking the absolute value. The SF1 is computed at step 520 as follows:

$$SF1 = \left| \sin\left(\frac{\Delta\varphi}{2}\right) \right| \quad (26A)$$

In an alternative embodiment (not illustrated in FIG. 5), the first scaling factor can be generated by determining a value of a first sine function (26B) that depends on the voltage angle difference (Δφ) when the voltage angle difference (Δφ) is between 0 and 180 degrees, and by determining a value of a second sine function (26C) that depends on 2π (360 degrees) minus the voltage angle difference (Δφ) when the voltage angle difference (Δφ) is between 180 and 360 degrees.

$$SF1 = \sin\left(\frac{\Delta\varphi}{2}\right), \text{ when } 0 \leq \Delta\varphi \leq 180 \quad (26B)$$

$$SF1 = \sin\left(\frac{2\pi - \Delta\varphi}{2}\right), \text{ when } 180 < \Delta\varphi \leq 360 \quad (26C)$$

At step 530, an unscaled approximation (Ã) of the peak voltage is determined based on endpoint value (epv) (from step 510) and the first scaling factor (SF1) (from step 520). In one exemplary implementation, the unscaled approximation (Ã) of the peak summed magnitude (A) is computed using the endpoint value (epv) determined at step 510, the first scaling factor (SF1) determined at step 520 in a normalization function (NF) as illustrated in equation (27) as follows:

$$Ã = (1 - \text{epv}) \cdot SF1 + \text{epv} \quad (27)$$

In this implementation, step 530 "normalizes" the epv to 1 within range endpoint to 1.0. Specifically, multiplying SF1 by (1−epv) scales SF1 to the range of 1−epv, and adding epv to that result offsets that to the range epv to 1.

At step 540, the unscaled approximation (Ã) is scaled further based on a second scaling factor (SF2) to generate an approximated peak summed magnitude (A) of the phase voltage (Vph). The unscaled approximation (Ã) is scaled further so that it has the same magnitude as the voltage vectors and thus corresponds to the peak magnitude or "largest possible" value of the of the sinusoidal phase voltage waveform (Vph)). In other words, scaling is performed so that the approximated peak summed magnitude (A) will have the same magnitude as the voltage vectors. Therefore, the unscaled approximation (Ã) is multiplied by the largest possible value of the voltage magnitude, which is the second scaling factor (SF2) defined as the sum of the fundamental voltage vector magnitude (V1) and the third harmonic voltage vector magnitude (V3). The processing performed at step 540 can be represented in equation (28) as follows:

$$A = (V1 + V3) \cdot \tilde{A} \qquad (28),$$

where V1+V3 is the second scaling factor (SF2).

As will now be illustrated in an example, this approximated peak summed magnitude (A) very closely approximates the peak summed magnitude (A) of the fundamental voltage vector (V1, φ1) and the third harmonic voltage vector (V3, φ3).

Exemplary Implementation

In one specific implementation that will now be described, the values used in the EVF are: a=1.000651949078879, b=1.054570818039014, c=0.5501079806417199, d=0.02689414501158193 and e=0.0515812426870589. Having specified the EVF, the method 500 for approximating peak summed magnitude (A) can be implemented as will now be described with reference to FIGS. 3 and 4. In this example, it will be assumed that V1 is 1.5, V3 is 0.5, Δsp is 90 degrees, in which case FIG. 3 indicates that the peak summed magnitude (A) of the phase voltage (Vph) is approximately 0.92.

Applying method 500 given these values, the magnitude ratio (x) of the fundamental-to-third harmonic voltage vector (V1/V3) would be 3.0, and the computed endpoint value (epv) would be 0.70709, which is consistent with the epv of plot 350 of FIG. 3. The first scaling factor (SF1) would be computed as the absolute value of the function sine (Δφ/2), which is sine (45°) in this example, or 0.7071068. The endpoint normalization function (ENF) is then applied to the endpoint value (epv) (0.70709) and the first scaling factor (0.7071068) to generate an unscaled approximation (Ã) of the peak voltage, which in this example would be 0.9142 (i.e., 0.7071068*(1.0−0.70709)+0.70709).

This unscaled approximation (Ã) of the peak summed magnitude (A) of the fundamental voltage vector and the third harmonic voltage vector (0.9142) that is computed using method 500 is very close to the approximate peak summed magnitude (A) of 0.92 (as approximated from the curve in FIG. 3). 0.92 is the value normalized to 1, but it has not yet been scaled. Next, the unscaled approximation (Ã) is scaled further to generate an approximated peak summed magnitude (A) of the phase voltage (Vph). In this example, the unscaled approximation (Ã) of the peak voltage (0.9142) can be multiplied by the second scaling factor (SF2) (2.0). This results in an approximated peak summed magnitude (A) of 1.8284, which is close to the largest value of the phase voltage (Vph) from the equation above for all values of θe.

Figure 6:
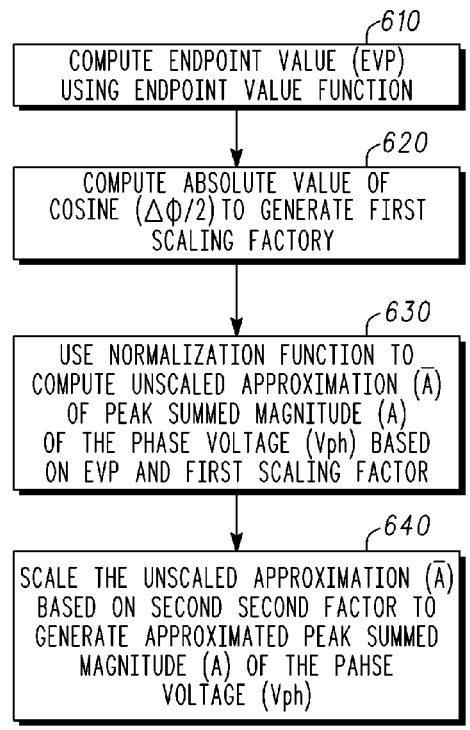
FIG. 6 is a flowchart illustrating another method for approximating peak summed magnitude (A) of a fundamental voltage vector and a third harmonic voltage vector according to another exemplary embodiment.

FIG. 6 is a flowchart illustrating another method 600 for approximating peak summed magnitude (A) of a fundamental voltage vector and a third harmonic voltage vector according to another exemplary embodiment. Method 600 is similar to method 500 except that in this exemplary embodiment, the phase voltage (Vph) is expressed as indicated in equation (29). As explained above, because the fundamental voltage (V1) and the third harmonic voltage (V3) vectors can both be positive or negative, the third harmonic voltage (V3) can either be added to or subtracted from the fundamental voltage (v1), and therefore it makes no difference whether they are added to or subtracted from each other when considering the full range of input values. In this embodiment, the phase voltage (Vph) (for any phase a, b, c, d, e) can be expressed as indicated in equation (29) below, which covers the case when the vectors are added:

$$V_{ph} = V1 \cdot \cos(\theta e) + V3 \cdot \cos(3\theta e + \Delta\phi) \qquad (29),$$

Here the phase voltage (Vph) is the sum of the fundamental voltage vector and the third harmonic voltage vector instead of the difference between them as in equation (24) of FIG. 5.

In accordance with this embodiment, the steps 510, 530 and 540 in method 500 are identical to those in steps 610, 620, and 640 of method 600. However, in method 600, different equations can be used to generate/compute the first scaling factor. For example, in one embodiment, the absolute value of the function cos(Δφ/2) is computed at step 620 to generate a first scaling factor (SF1). The absolute value of the function cos(Δφ/2) is used to compute SF1 to "fold back" or limit the angle φ to the range of 0° to 180° (i.e., to exclude the interval over 180° to 360°) after computing cos(Δφ/2). The SF1 can be computed at step 620 as expressed in equation (30A) as follows:

$$SF1 = \left|\cos\left(\frac{\Delta\varphi}{2}\right)\right| \qquad (30A)$$

In an alternative embodiment (not illustrated in FIG. 6), the first scaling factor can be generated by determining a value of a first cosine function (30B) that depends on the voltage angle difference (Δφ) when the voltage angle difference (Δφ) is between 0 and 180 degrees, and by determining a value of a second cosine function (30C) that depends on 271 (360 degrees) minus the voltage angle difference (Δφ) when the voltage angle difference (Δφ) is between 180 and 360 degrees.

$$SF1 = \cos\left(\frac{\Delta\varphi}{2}\right), \text{ when } 0 \le \Delta\varphi \le 180 \qquad (30B)$$

$$SF1 = \cos\left(\frac{2\pi - \Delta\varphi}{2}\right), \text{ when } 180 < \Delta\varphi \le 360 \qquad (30C)$$

Figure 7:
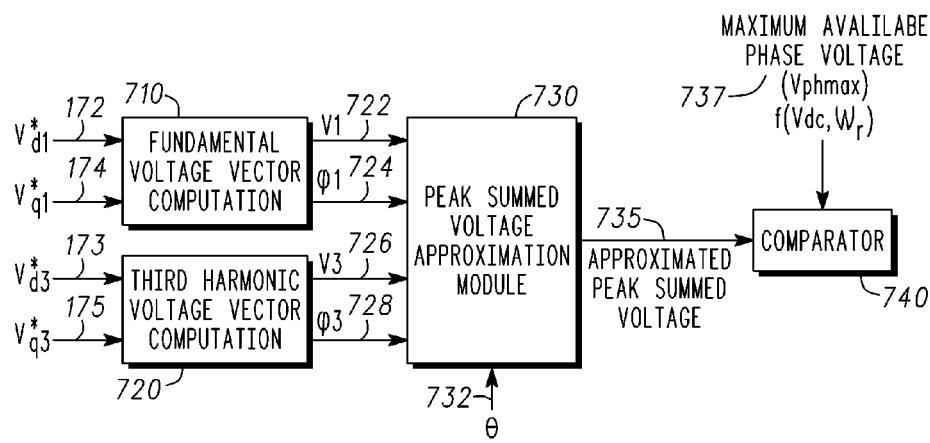
FIG. 7 is a block diagram of a phase voltage monitoring system in accordance with another exemplary embodiment.

Once the approximated peak summed magnitude (A) of the phase voltage (Vph) has been determined, it can be used for a number of different purposes some of which will now be described with reference to FIG. 7, which is a block diagram of a phase voltage monitoring system 700 in accordance with one of the disclosed embodiments. The phase voltage monitoring system 700 can be implemented in conjunction with a multi-phase system, such as the system 100 illustrated in FIG. 1.

The phase voltage monitoring system 700 includes a fundamental voltage vector computation module 710, a third harmonic voltage vector computation module 720, an approximation module 730 and a comparator module 740.

The fundamental voltage vector computation module 710 generates a fundamental voltage vector based on the fundamental d-axis voltage command signal (Vd1*) 172 and the fundamental q-axis voltage command signal (Vq1*) 174 that are generated by the synchronous frame current regulator of FIG. 1. As described above, the fundamental voltage vector has a magnitude (V1) 722 and an angle (φ1) 724. Similarly, the third harmonic voltage vector computation module 720 that generates a third harmonic voltage vector based on the third harmonic d-axis voltage command signal (Vd3*) 173 and the third harmonic q-axis voltage command signal (Vq3*) 175. The third harmonic voltage vector has a magnitude (V3) 726 and an angle (θ) 728. As described above, the phase voltage (Vph) waveform is defined based on the fundamental voltage vector magnitude (V1), the third harmonic voltage vector magnitude (V3), an electrical angular position (θ) 732 that is a function of rotor position (θr), and the voltage angle difference (Asp) between the angle (φ1) 724 of the fundamental voltage vector and the angle (θ) 728 of the third harmonic voltage vector.

The approximation module 730 receives the information about the vectors and approximates a peak summed magnitude (A) of a phase voltage (Vph) waveform. Specifically, the approximation module 730 generates an approximated peak summed magnitude (A) 735 of the phase voltage (Vph) waveform that substantially corresponds to the peak summed magnitude (A) of the phase voltage (Vph) waveform.

To generate the approximated peak summed magnitude (A) 735, the approximation module 730 can perform steps such as those described with reference to FIG. 5 or FIG. 6 above. As such, the approximation module 730 can compute an endpoint value (epv) based on a magnitude (V1) of a fundamental voltage vector and a magnitude (V3) of a third harmonic voltage vector. The approximation module 730 can determine a voltage angle difference (Asp) between the angle (φ1) 724 of the fundamental voltage vector and the angle (θ) 728 of the third harmonic voltage vector, and then determine an absolute value of a sine or cosine function when one-half of the voltage angle difference is applied to the sine or cosine function to generate a first scaling factor (SF1). The approximation module 730 can apply the endpoint value (epv) and the first scaling factor (SF1) to a normalization function (NF) that computes an unscaled approximation (Ã) of a peak value of the phase voltage (Vph) waveform. This unscaled approximation (Ã) can then be scaled, based on a second scaling factor (SF2) that represents the largest possible magnitude value of the phase voltage (Vph) waveform, to generate the approximated peak summed magnitude (A) of the phase voltage (Vph) waveform that substantially corresponds to the peak summed magnitude (A) of the phase voltage (Vph) waveform.

The comparator module 740 determines whether the approximated peak summed magnitude (A) 735 of the phase voltage (Vph) waveform is greater than or equal to a maximum available value 737 of the phase voltage (Vphmax) available from the inverter module 110, which is a function of voltage in the dc-link voltage (Vdc) and machine speed (ωr). For example, the peak (A) of phase voltage can be monitored to determine when the current regulator output reaches the value 737 of the maximum phase voltage (Vphmax) to ensure that the phase voltage does not exceed the value 737 of the maximum voltage (Vphmax) available.

For example, the peak summed magnitude (A) of the phase voltage (Vph) represents the maximum peak voltage that can be used to regulate phase currents (Ia . . . Ie) 122-126. In one implementation it can be used by a field-weakening algorithm (not illustrated in FIG. 1) to modify the fundamental d-axis current command signal (Id1*) 142, the third harmonic d-axis current command signal (Id3*) 143, the fundamental q-axis current command signal (Iq1*) 144, and the third harmonic q-axis current command signal (Iq3*) 145 that are generated by the torque-to-current mapping module 140 before they are provided to the synchronous current regulator module 170 to make sure that the synchronous current regulator module 170 does not exceed the value 737 of the maximum phase voltage (Vphmax) available. For instance, when it is determined that the value 737 of the maximum phase voltage (Vphmax) available is reached, current regulator modules (in the synchronous current regulator 170) can be clamped and/or current commands are changed so that it is not exceeded. When the peak voltage value (A) approaches the value 737 of the maximum phase voltage (Vphmax) available, current commands 142-146 can be adjusted to prevent the peak voltage value (A) from exceeding the value 737 of the maximum phase voltage (Vphmax) available. In other embodiments, when the peak voltage value (A) approaches the value 737 of the maximum phase voltage (Vphmax) available current regulator modules can be clamped so that output command voltages from current regulator modules are kept constant to prevent the peak voltage value (A) from exceeding the value 737 of the maximum phase voltage (Vphmax) that is available. In still other embodiments, a combination of both approaches can be implemented.

As such, the disclosed embodiments can be applied to multi-phase systems that implement third harmonic current/voltage injection to quickly approximate peak phase voltage value for any combination of fundamental and third harmonic voltage vectors. Because the approximation method is very fast (in contrast to an actual calculation), the approximated peak summed magnitude (A) of the phase voltage (Vph) waveform can be determined within the time allotted to each PWM cycle. Stated differently, since the execution time of the control loop is reduced this allowing the PWM switching frequency to be boosted or increased to a PWM switching frequency that is faster than in other implementations where the peak voltage is iterative calculated. For instance, in comparison to an iterative calculation, some embodiments can reduce control loop execution time by at least 25 percent. This also facilitates the use of the higher switching frequencies without exceeding the time available to perform control calculations required to multi-phase machines that implement third harmonic injection.

For example, because the disclosed techniques can be used to calculate the approximated peak summed magnitude (A) of the phase voltage (Vph) waveform during each PWM cycle, this also allows real-time implementation of field-weakening control algorithms without exceeding the time available to perform control calculations when a multi-phase machine operates at medium to high speeds in its field-weakening region. This is of particular importance when the machine operates in the field-weakening region since it is important to control the machine to maximize machine power and efficiency so that the maximum phase voltage (Vphmax) is used whenever possible, but is not exceeded. As such, the peak summed magnitude (A) of the phase voltage (Vph) can be used to implement field-weakening algorithms and help ensure that the phase voltage does not exceed the maximum phase voltage (Vphmax) available.

It should be observed that the disclosed embodiments reside primarily in combinations of method steps and apparatus components related to approximating a peak summed magnitude (A) of a phase voltage (Vph) waveform in a multi-phase system. Some of the embodiments and implementations are described above in terms of functional and/or logical block components (or modules) and various processing steps. Those of skill in the art will appreciate that the various illustrative logical blocks, modules, and steps described in connection with these embodiments may be implemented as electronic hardware, computer software, firmware or combinations thereof.

To clearly illustrate this interchangeability of hardware and software, various components, logical blocks, modules, and steps have been described above generally in terms of their functionality. Whether such functionality is implemented as hardware or software depends upon the particular application and design constraints imposed on the overall system. One of ordinary skill, notwithstanding possibly significant effort and many design choices motivated by, for example, available time, current technology, and economic considerations, will be readily capable of generating software instructions and programs and ICs with minimal experimentation when guided by the concepts and principles disclosed herein. Skilled artisans may implement the described functionality in varying ways for each particular application, but such implementation decisions should not be interpreted as causing a departure from the scope of the present invention.

It will be appreciated that embodiments of the invention described herein may be implemented using one or more conventional processors and unique stored program instructions that control the one or more processors to implement, in conjunction with certain non-processor circuits, some, most, or all of the functions for approximating a peak summed magnitude (A) of a phase voltage (Vph) waveform in a multi-phase system, as described herein. As such, these functions may be interpreted as steps of a method for approximating a peak summed magnitude (A) of a phase voltage (Vph) waveform in a multi-phase system.

The various illustrative logical blocks, modules, and steps described herein may also be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration. Alternatively, some or all functions could be implemented by a state machine that has no stored program instructions, in which each function or some combinations of certain of the functions are implemented as custom logic. Of course, a combination of these approaches could be used. In some implementations, analog and/or digital circuits, discrete or integrated analog or digital electronic circuits or combinations thereof, one or more application specific integrated circuits (ASICs), one or more microprocessors, and/or one or more digital signal processor (DSP) based circuits can be used when implementing part or all of the various components, modules, steps and other logic described herein.

The steps of a method or algorithm described in connection with the embodiments disclosed herein may be embodied in a software module executed by a processor. The software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for approximating a peak summed magnitude of a phase voltage waveform comprising voltage vectors including a fundamental voltage vector and a third harmonic voltage vector in a multi-phase system, the method comprising:

computing an endpoint value based on a magnitude of a fundamental voltage vector and a magnitude of a third harmonic voltage vector, wherein the endpoint value is the lowest value of the peak summed magnitude for a particular ratio of the magnitude of the fundamental voltage vector to the magnitude of the third harmonic voltage vector;

generating a first scaling factor based on a voltage angle difference between an angle of the fundamental voltage vector and an angle of the third harmonic voltage vector;

determining, based on the endpoint value and the first scaling factor, an unscaled approximation of the peak summed magnitude of the phase voltage waveform; and scaling the unscaled approximation based on a second scaling factor to generate an approximated peak summed magnitude of the phase voltage waveform that substantially corresponds to the peak summed magnitude of the phase voltage waveform.

2. A method according to claim 1, wherein the step of determining, based on the endpoint value and the first scaling factor, an unscaled approximation of the peak summed magnitude of the phase voltage waveform, further comprises:

applying a normalization function to the endpoint value and the first scaling factor to determine an unscaled approximation of the peak summed magnitude of the fundamental voltage vector and the third harmonic voltage vector.

3. A method according to claim 1, wherein the step scaling the unscaled approximation, further comprises:

scaling the unscaled approximation based on the second scaling factor so that the unscaled approximation has the same magnitude as the fundamental and third harmonic voltage vectors to generate the approximated peak summed magnitude of the phase voltage waveform that substantially corresponds to the peak summed magnitude of the phase voltage waveform.

4. A method according to claim 3, wherein the second scaling factor represents the largest possible magnitude value of the phase voltage waveform, and is defined as the sum of the fundamental voltage vector magnitude and the third harmonic voltage vector magnitude, and wherein the step of scaling the unscaled approximation, further comprises:

multiplying the unscaled approximation by the second scaling factor so that the unscaled approximation has the same magnitude as the fundamental and third harmonic voltage vectors to generate an approximated peak summed magnitude of the phase voltage waveform that substantially corresponds to the peak summed magnitude of the phase voltage waveform.

5. A method according to claim 1, wherein the phase voltage waveform is a sinusoidal waveform that drives any one phase of a five-phase machine, and wherein the peak summed magnitude of the phase voltage waveform is determined based on the sum of the fundamental voltage vector and the third harmonic voltage vector, wherein the phase voltage waveform is defined based on the fundamental voltage vector magnitude, the third harmonic voltage vector magnitude, an electrical angular position that is a function of rotor position, and the voltage angle difference.

6. A method according to claim 1, wherein the step of generating a first scaling factor, comprises:

generating a first scaling factor by:
determining a value of a first function that depends on a voltage angle difference between an angle of the fundamental voltage vector and an angle of the third harmonic voltage vector when the voltage angle difference is between 0 and 180 degrees; and
determining a value of a second function that depends on 360 degrees minus the voltage angle difference when the voltage angle difference is between 180 and 360 degrees.

7. A method according to claim 1, wherein the step of generating a first scaling factor, comprises:

generating a first scaling factor by determining the absolute value of a function that depends on a voltage angle difference between an angle of the fundamental voltage vector and an angle of the third harmonic voltage vector.

8. A method according to claim 7, wherein the step of generating a first scaling factor, comprises:

generating a first scaling factor by determining the absolute value of a cosine function or a sine function that depends on the voltage angle difference.

9. A method executable by an approximation module in a multi-phase system, the method comprising:

approximating, at the approximation module, a peak summed magnitude of a phase voltage waveform, to generate an approximated peak summed magnitude of the phase voltage waveform that substantially corresponds to the peak summed magnitude of the phase voltage waveform, wherein the phase voltage waveform comprises a fundamental voltage vector and a third harmonic voltage vector.

10. A method according to claim 9, further comprising:

determining, at the approximation module, an endpoint value based on a magnitude of a fundamental voltage vector and a magnitude of a third harmonic voltage vector, wherein the endpoint value is the lowest value of the peak summed magnitude for a particular ratio of the magnitude of the fundamental voltage vector to the magnitude of the third harmonic voltage vector;
generating, at the approximation module, a first scaling factor based on a voltage angle difference between an angle of the fundamental voltage vector and an angle of the third harmonic voltage vector;
determining, at the approximation module, based on the endpoint value and the first scaling factor, an unscaled approximation of the peak summed magnitude of the phase voltage waveform; and
generating, at the approximation module, based on the unscaled approximation, the approximated peak summed magnitude of the phase voltage waveform that substantially corresponds to the peak summed magnitude of the phase voltage waveform.

11. A method according to claim 10, wherein the step of determining, at the approximation module, based on the endpoint value and the first scaling factor, an unscaled approximation of the peak summed magnitude of the phase voltage waveform, comprises:

normalizing, at the approximation module, the endpoint value via a normalization function that computes the unscaled approximation based on the endpoint value and the first scaling factor.

12. A method according to claim 10, wherein the step of generating, at the approximation module, based on the unscaled approximation ($\tilde{A}$), the approximated peak summed magnitude of the phase voltage waveform that substantially corresponds to the peak summed magnitude of the phase voltage waveform, comprises:

scaling, at the approximation module, the unscaled approximation based on the second scaling factor so that the unscaled approximation has the same magnitude as the fundamental and third harmonic voltage vectors to generate the approximated peak summed magnitude of the phase voltage waveform that substantially corresponds to the peak summed magnitude of the phase voltage waveform.

13. A method according to claim 12, wherein the second scaling factor represents the largest possible magnitude value of the phase voltage waveform and is defined as the sum of the fundamental voltage vector magnitude and the third harmonic voltage vector magnitude, and wherein the step of scaling, comprises:

scaling the unscaled approximation by multiplying the unscaled approximation by the second scaling factor so that the unscaled approximation has the same magnitude as the fundamental and third harmonic voltage vectors to generate an approximated peak summed magnitude of the phase voltage waveform that substantially corresponds to the peak summed magnitude of the phase voltage waveform.

14. A method according to claim 9, wherein the phase voltage waveform is a sinusoidal waveform that drives any one phase of a five-phase machine, wherein the peak summed magnitude of the phase voltage waveform is determined based on the sum of the fundamental voltage vector and the third harmonic voltage vector, wherein the phase voltage waveform is defined based on the fundamental voltage vector magnitude, the third harmonic voltage vector magnitude, an electrical angular position ($\theta$) that is a function of rotor position, and the voltage angle difference ($\Delta\phi$).

15. A method according to claim 9, wherein generating, at the approximation module, a first scaling factor, comprises:

generating a first scaling factor by determining the absolute value of a function that depends on a voltage angle difference between an angle of the fundamental voltage vector and an angle of the third harmonic voltage vector.

16. A method according to claim 15, further comprising:

generating, at the approximation module, the first scaling factor by determining the absolute value of a cosine function or a sine function that depends on the voltage angle difference.

17. A method according to claim 9, generating, at the approximation module, a first scaling factor, comprises:
generating a first scaling factor by:
determining a value of a first function that depends on a voltage angle difference between an angle of the fundamental voltage vector and an angle of the third harmonic voltage vector when the voltage angle difference is between 0 and 180 degrees; and
determining a value of a second function that depends on 360 degrees minus the voltage angle difference when the voltage angle difference is between 180 and 360 degrees.

18. A multi-phase system, comprising:
a fundamental voltage vector computation module that generates a fundamental voltage vector based on a fundamental d-axis voltage command signal and a fundamental q-axis voltage command signal;
a third harmonic voltage vector computation module that generates a third harmonic voltage vector based on a third harmonic d-axis voltage command signal and a third harmonic q-axis voltage command signal, wherein the phase voltage waveform is defined based on a fundamental voltage vector magnitude, a third harmonic voltage vector magnitude, an electrical angular position that is a function of rotor position, and a voltage angle difference between an angle of the fundamental voltage vector and an angle of the third harmonic voltage vector; and
an approximation module designed to approximate a peak summed magnitude of a phase voltage waveform and to generate an approximated peak summed magnitude of the phase voltage waveform that corresponds approximately to the peak summed magnitude of the phase voltage waveform.

19. A multi-phase system according to claim 18, wherein the approximation module is designed to:
determine an endpoint value based on the magnitude of a fundamental voltage vector and the magnitude of a third harmonic voltage vector, wherein the endpoint value is the lowest value of the peak summed magnitude for a particular ratio of the magnitude of the fundamental voltage vector to the magnitude of the third harmonic voltage vector;
determine a voltage angle difference between an angle of the fundamental voltage vector and an angle of the third harmonic voltage vector, and determine an absolute value of a sine function when one-half of the voltage angle difference is applied to the sine function to generate a first scaling factor;
compute an unscaled approximation of a peak value of the phase voltage waveform that is equal to the peak summed magnitude of the fundamental voltage vector and the third harmonic voltage vector by applying the endpoint value and the first scaling factor to a normalization function that computes the unscaled approximation based on the endpoint value and the first scaling factor; and
scale the unscaled approximation, based on a second scaling factor that represents the largest possible magnitude value of the phase voltage waveform, to generate the approximated peak summed magnitude of the phase voltage waveform that substantially corresponds to the peak summed magnitude of the phase voltage waveform, wherein the second scaling factor is the sum of the fundamental voltage vector magnitude and the third harmonic voltage vector magnitude.

20. A multi-phase system according to claim 18, further comprising:
a comparator module designed to determine whether the approximated peak summed magnitude of the phase voltage waveform is greater than or equal to a maximum available value of the phase voltage.

* * * * *